Figure 7:
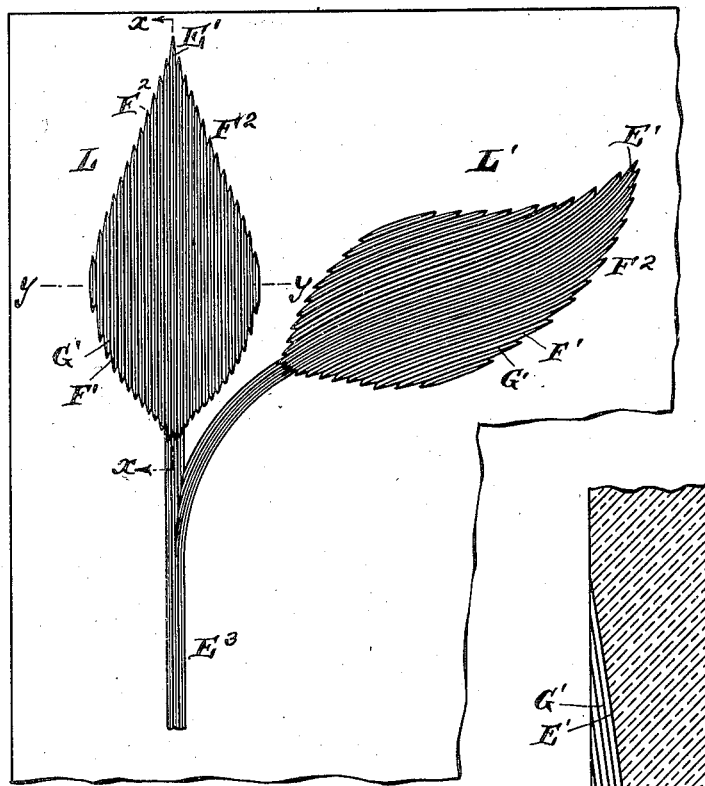

J. STOTT.
METHOD OF CUTTING ORNAMENTATION ON GLASS ARTICLES.
APPLICATION FILED JAN. 30, 1914.
1,103,631.
Patented July 14, 1914.
2 SHEETS—SHEET 1.
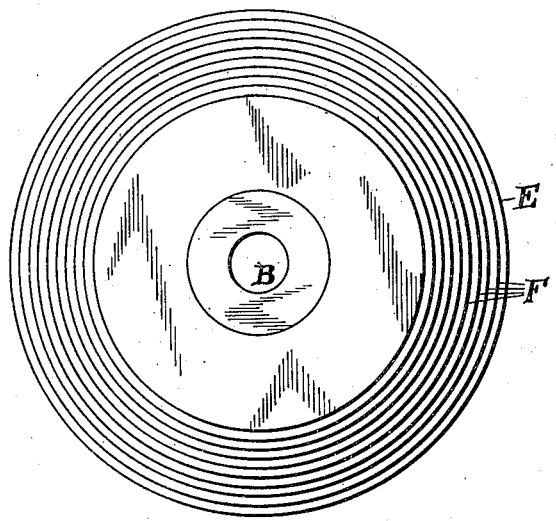
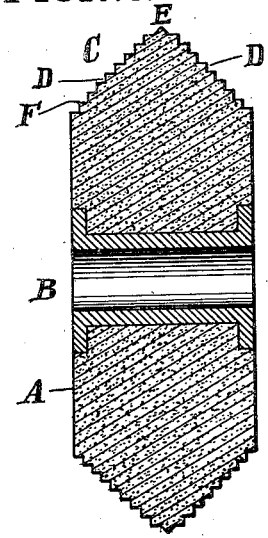
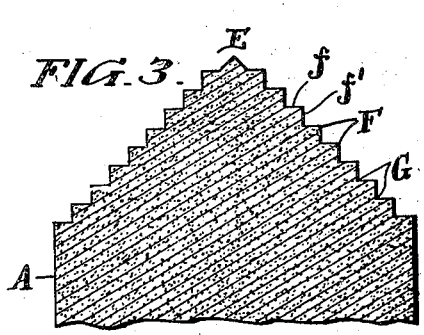
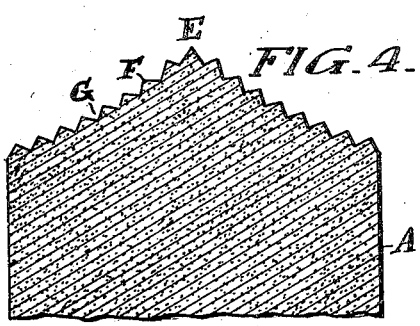
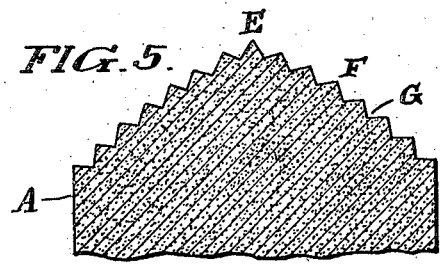
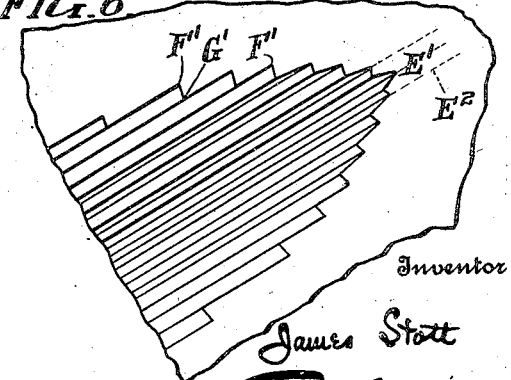
Witnesses
Daniel Webster Jr.
E. W. Smith.
Inventor
James Stott
By
Attorney J. STOTT.
METHOD OF CUTTING ORNAMENTATION ON GLASS ARTICLES.
APPLICATION FILED JAN. 30, 1914.

Patented July 14, 1914.

WITNESSES

UNITED STATES PATENT OFFICE.

JAMES STOTT, OF MANAYUNK, PENNSYLVANIA.

METHOD OF CUTTING ORNAMENTATION ON GLASS ARTICLES.

1,103,631.  Specification of Letters Patent.  Patented July 14, 1914.

Application filed January 30, 1914. Serial No. 815,367.

*To all whom it may concern:*

Be it known that I, JAMES STOTT, citizen of the United States, and resident of Manayunk, county of Philadelphia, and State of Pennsylvania, have invented an Improvement in Methods for Cutting Ornamentation on Glass Articles, of which the following is a specification.

The object of my invention is to provide a method to obtain the ornamentation of cut-glass articles, such as those used for table ware, toilet articles, and similar purposes, whereby the ornamentation may be produced with rich effect and low cost.

In the preferred carrying out of my invention, the cutting is produced in that form in which there would be more or less of a depression substantially V-shaped in cross section, and in which, moreover, the surfaces of the depression would have formed in their walls a plurality of parallel minor or secondary V-depressions or cuts, which may be either left in frosted condition or polished, as desired.

In practising my improved method, a single operation of cutting the ornamentation not only may produce the main cut as to variable depth, but also simultaneously produces the secondary parallel V-cuts, so that there is a minimum handling and time consumed in forming a large number of parallel cuts which are so grouped as to produce a brilliant prismatic effect where the grooves are polished, or a rich frosted effect where the grooves are not polished, said frosted effect being in strong contrast with the polished surface of the general body of the article.

My improved method is best practised by special manipulation of a grinding wheel of corundum or emery composition, having its peripheral surface provided with a plurality of parallel cutting portions having V-shaped transverse sectional configurations, adjacent circumferential cutting edges being arranged at different radial distances from the axis of the wheel, and in the preferred form of such grinding wheel, the peripheral cutting part of the wheel is formed by two surfaces meeting in a plane between the sides of the wheel, and said surfaces of more or less conical shape and provided with a large number of small circumferential parallel cutting edges of substantially V-shaped cross section, the whole forming a cutting tool with a more or less V-shaped circumferential cutting part, the inclined surfaces of which are also provided with V-shaped cutting ridges of smaller size, all of which will be better understood by reference to the accompanying drawings, in which:—

Figure 8:
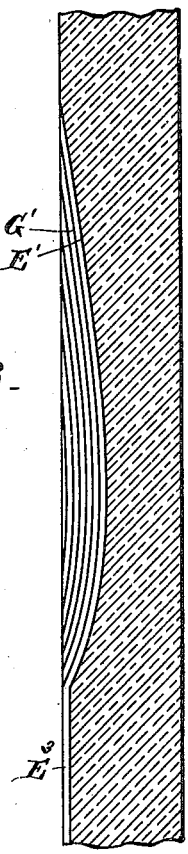
Figure 9:
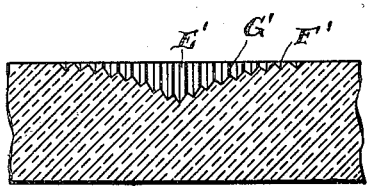

Figure 1 is a side elevation of a grinding wheel adapted for use in the method embodying my invention; Fig. 2 is a transverse section of the same; Fig. 3 is an enlarged view of the upper portion of Fig. 2 showing more in detail the cutting surface; Figs. 4 and 5 are similar sectional views corresponding to Fig. 3, and showing modifications of the peripheral cutting surfaces; Fig. 6 is a plan view illustrating a portion of the leaf effect which may be produced by my improved method at one operation by the use of a grinding wheel of the character shown in Fig. 5; Fig. 7 is a plan view of two full leaf and stem effects produced by my improved method by employing the grinding wheel, having the form shown in Fig. 4; Fig. 8 is a vertical section of Fig. 7 on line $x$—$x$; and Fig. 9 is a transverse section of Fig. 7 on line $y$—$y$.

The improved method of my invention consists essentially in simultaneously cutting into the surface of the article a series of parallel V cuts, each of small cross section, the adjacent cuts being of different lengths and average depths and moreover, in which the section of the cut surface decreases in depth gradually from the middle outwardly, both transversely and longitudinally of the leaf effect design produced. I will now first describe the forms of grinding wheels suitable for carrying out the method of my invention and then describe their use.

A is the body of the wheel, and may be bushed with a metal bushing of lead or other material, as indicated at B. The body A is formed of corundum, emery or other suitable dense and hard grinding material, molded or formed under any of the usual processes into a grinding disk or wheel, and having its peripheral surface C provided with a plurality of circumferential cutting edges, V-shaped in cross section, and lying in parallel planes to the general plane of the wheel. In the preferred form of my grinding wheel, the peripheral surface is formed by two general surfaces D, D, which meet in a circumferential V-shaped cutting edge E, so that the general cross section of the wheel provides a grinding surface of substantially V-shaped cross section. The surfaces D, D, are more or less conical, and instead of being plain are provided with circumferential grinding edges F separated by the depressions G, also preferably V-shaped in cross section. Where the surfaces D, D, meet at right angles and the minor V-cutting edges F are also formed by faces $f, f'$, at right angles, the wheel will be provided with a stepped arrangement terminating in a V-shaped upper cutting edge E, as indicated in Fig. 3. In this case, the radial outward circumferential surfaces $f$ will directly grind upon the glass, and this action combined with the action of the other faces $f'$, will produce V-cuts in the side faces of the main V-cut which is being produced in the glass body of the article. These series of V-cuts thus produced in the side surfaces of the main V-cut will terminate at the extreme bottom of the main V-cut in the V produced by the central peripheral cutting edge E. which makes a clearly defined central line to the ornamentation.

In the construction of grinding surface shown in Fig. 4, the conical surfaces which meet in the grinding edge E are shown as more oblique making the general configuration of the cutting surface C more flattened than in the case of Fig. 3. Its surfaces D are also shown as slightly curved in cross section, the curvature being inward so that the outer surfaces are somewhat concave. In this case, the secondary V-cutting edges F will be more directly presented to the glass in the cutting operation, so that each of the faces $f, f'$, thereof acts in more or less the same manner in producing the secondary V-cuts in the main or large V-groove formed in the body of the glass ware.

In the construction shown in Fig. 5, I have substantially the same details as in Fig. 4, except that the outer inclined surfaces are curved slightly outward so that in cross section they are convex, and the said convex surfaces provided with the V-cut edges F, as aforesaid. The general configuration of the peripheral cutting surfaces may be varied within large limits provided the adjacent cutting edges F of the cutting surface are arranged at different peripheral distances from the axial line of the grinding wheel; and it will also be understood that in a grinding wheel of the general character herein described, the same may be used to ornament the glass by using only one of the surfaces D in certain cases where the ornamentation will permit. The usual main ornamentation, however, involves the use of V-cuts of considerable depth, and this grinding wheel is especially adapted for such purposes; but in other forms of ornamentation, the plurality of parallel V-grooves may be cut in the surface of the glass by the action of one of the peripheral surfaces D, or the wheel may be formed as if only composed of one such surface.

As an example of the ornamental cutting which is possible with my grinding wheel, I have illustrated in Fig. 6 the terminal portion of a leaf cut. This cut is accomplished with the grinding wheel of the character shown in Fig. 5, and it will be seen that the central cutting edge E produces the central V-cut E' of the leaf, whereas the secondary V-cutting edges F produce the secondary V-grooves F' in the leaf. Moreover, the V-grooves G of the cutting tool provide the sharp V-ridges G' of the leaf. In Fig. 7, I have shown two full leaves on a stem and lettered to correspond to the lettering in Fig. 6 except that the stem is lettered $E^3$. Fig. 8 indicates the varying depths of the cuts longitudinally of the leaf and Fig. 9 illustrates the varying depths of the successive parallel V cuts transversely of the leaf. The particular cuts here shown in Figs. 7, 8 and 9 are produced by use of the grinding wheel shown in Fig. 4. While the leaf L in Fig. 7 has all of the V cuts straight the leaf L' has such cuts curved for graceful effect but all of the said cuts are simultaneously produced by the one operation and bear the same identical relation as in the leaf L. If desired, the general depression may be ground out preliminary to the cutting of the parallel V grooves to quicken the method and put less wear on the special grinding wheel, but this is optional with the workman. The parts F' and G' and their connecting walls meet with the surface of the glass body in such a manner that there is a serrated edge $F^2$ similar to that found in leaf structures (Figs. 6 and 7). In the cutting of such a leaf effect, the grinding wheel is caused to cut into the body of the glass to a gradually increasing depth from the points of the leaf effect to what would be approximately the center of the leaf; and for short stubby leaves, a direct radial pressure upon the wheel with but little longitudinal movement of the glass will produce the serrated leaf effect; but for long leaves, more as indicated in Figs. 6 and 7, the glass article would be moved parallel to the plane of rotation of the wheel to the desired extent so as to extend the length of the leaf cut and have a relatively less depth to the length in the finished leaf ornamentation. In manipulating the glass upon the grinding wheel the glass may be cut more abruptly to the desired depth on the part of the leaf next to the stem than at the point of the leaf and this is indicated in Fig. 8, and produces a more pointed leaf with better defined serrated points $F^2$ at the end of each of the parallel V cuts. To produce the stem effect on the leaf, it is only necessary to cut the surface of the glass article with the V-edge E; or, if desired, by the said cutting edge and the adjacent secondary cutting edges F, as would be indicated by the dotted lines at E² in Fig. 6 and in full lines at E³ in Fig. 7.

There are numerous ways of using the wheel in the cutting operation, and I do not confine myself to any special application, but give the illustration in Figs. 6 to 9 inclusive of the leaf effect as an example of the artistic results of the use of a wheel embodying my invention. The angle of the cutting faces of the secondary circumferential V-edges may be more or less varied to suit the desire of the designer; and likewise, the angle or general circumferential shape produced by the arrangement of these secondary circumferential V-cutting edges may be greatly varied and the wheels employed without departing from the spirit of the invention.

In this application I do not make claim to the article as that is reserved for a separate application.

Having now described my invention, what I claim as new and desire to secure by Letters Patent, is:—

1. The herein described method in the art of producing a serrated ornamental effect in the surface of a glass article, which consists in simultaneously cutting a plurality of parallel grooves of relatively small size to constitute together a large groove of gradually decreasing depth from its middle transversely and longitudinally and thereby causing the parallel grooves to terminate in the surface of the glass article in relatively different positions longitudinally to the cutting, whereby the surfaces of each of said grooves provides in their meeting lines with the surface of the glass article a zig-zag or serrated effect.

2. The herein described method in the art of producing a serrated ornamental effect in the surface of a glass article, which consists in producing a leaf effect by simultaneously cutting a plurality of parallel grooves of relatively small size to constitute together a large groove of gradually decreasing depth from its middle transversely and longitudinally and thereby causing the parallel grooves to terminate in the surface of the glass article in relatively different positions longitudinally to the cutting, whereby the surfaces of each of said grooves provides in their meeting lines with the surface of the glass article a zig-zag or serrated effect, and connecting one terminal point of leaf effect with a stem effect formed by simultaneously cutting into the surface of the glass a plurality of parallel very shallow grooves of substantially constant depth the middle groove cut to a greater depth than the adjacent grooves on each side thereof.

In testimony of which invention, I hereunto set my hand.

JAMES STOTT.

Witnesses:
R. M. HUNTER,
E. W. SMITH.